US012278819B1

(12) United States Patent
Berkovitz et al.

(10) Patent No.: US 12,278,819 B1
(45) Date of Patent: *Apr. 15, 2025

(54) CYBERSECURITY THREAT DETECTION UTILIZING UNIFIED IDENTITY MAPPING AND PERMISSION DETECTION

(71) Applicant: Wiz, Inc., New York, NY (US)

(72) Inventors: Avihai Berkovitz, Tel Aviv (IL); George Pisha, Giv'atayim (IL); Yaniv Joseph Oliver, Tel Aviv (IL); Udi Reitblat, Tel Aviv (IL)

(73) Assignee: Wiz, Inc., New York, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/812,909

(22) Filed: Jul. 15, 2022

Related U.S. Application Data

(60) Provisional application No. 63/222,714, filed on Jul. 16, 2021.

(51) Int. Cl.
    *H04L 9/40* (2022.01)
(52) U.S. Cl.
    CPC ............ *H04L 63/104* (2013.01); *H04L 63/20* (2013.01)
(58) Field of Classification Search
    CPC .............................. H04L 63/104; H04L 63/20
    See application file for complete search history.

(56) References Cited

U.S. PATENT DOCUMENTS

| 6,910,132 | B1 | 6/2005 | Bhattacharya |
| 7,627,652 | B1 | 12/2009 | Commons et al. |
| 7,784,101 | B2 | 8/2010 | Verbowski et al. |
| 8,200,965 | B2 | 6/2012 | Fujibayashi et al. |
| 8,352,431 | B1 | 1/2013 | Protopopov et al. |
| 8,412,688 | B1 | 4/2013 | Armangau et al. |
| 8,413,239 | B2 | 4/2013 | Sutton |
| 8,417,967 | B2 | 4/2013 | Foster et al. |

(Continued)

FOREIGN PATENT DOCUMENTS

| EP | 4160983 A1 | 4/2023 |
| EP | 4254869 A2 | 10/2023 |

(Continued)

OTHER PUBLICATIONS

Ali Gholami; Security and Privacy of Sensitive Data in Cloud Computing: a Survey of Recent Developments; ARIX:2016; pp. 131-150.

(Continued)

*Primary Examiner* — Kambiz Zand
*Assistant Examiner* — Afaq Ali
(74) *Attorney, Agent, or Firm* — M&B IP Analysts, LLC (57) ABSTRACT

A system and method for detecting effective permissions of a principal in a cloud computing environment, includes detecting a group of principal nodes, each principal node representing a principal in a cloud computing environment, in a security graph, the security graph storing therein a representation of the cloud computing environment; selecting a first principal node from the group of principal nodes; determining a permission between the first principal node and a resource node, wherein the resource node represents a resource deployed in the cloud computing environment; and associating the group of principal nodes with the determined permission.

20 Claims, 8 Drawing Sheets

(56) References Cited

U.S. PATENT DOCUMENTS

| | | |
|---|---|---|
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,813,234 B1 | 8/2014 | Bowers et al. |
| 8,898,481 B1 | 11/2014 | Osburn, III et al. |
| 8,914,406 B1 | 12/2014 | Haugsnes |
| 9,009,836 B1 | 4/2015 | Yarykin et al. |
| 9,094,379 B1 | 7/2015 | Miller |
| 9,119,017 B2 | 8/2015 | Sinha |
| 9,165,142 B1 | 10/2015 | Sanders et al. |
| 9,172,621 B1 | 10/2015 | Dippenaar |
| 9,185,136 B2 | 11/2015 | Dulkin et al. |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,596,235 B2 | 3/2017 | Badam et al. |
| 9,607,104 B1 * | 3/2017 | Turner ............... G06F 16/9024 |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,459,664 B1 | 10/2019 | Dreier et al. |
| 10,536,471 B1 | 1/2020 | Derbeko et al. |
| 10,540,499 B2 | 1/2020 | Wailly et al. |
| 10,552,610 B1 | 2/2020 | Vashisht et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,721,260 B1 | 7/2020 | Schlarp et al. |
| 10,725,775 B2 | 7/2020 | Suarez et al. |
| 10,735,430 B1 | 8/2020 | Stoler |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,016,954 B1 | 5/2021 | Babocichin et al. |
| 11,044,118 B1 | 6/2021 | Reed et al. |
| 11,055,414 B2 | 7/2021 | Claes |
| 11,064,032 B1 | 7/2021 | Yang et al. |
| 11,099,976 B2 | 8/2021 | Khakare et al. |
| 11,102,231 B2 | 8/2021 | Kraning et al. |
| 11,165,652 B1 | 11/2021 | Byrne |
| 11,245,730 B2 | 2/2022 | Bailey |
| 11,271,961 B1 | 3/2022 | Berger |
| 11,334,670 B2 | 5/2022 | Franco et al. |
| 11,366,897 B1 | 6/2022 | Ramanathan et al. |
| 11,388,183 B2 | 7/2022 | Hoopes et al. |
| 11,397,808 B1 | 7/2022 | Prabhu et al. |
| 11,405,426 B2 * | 8/2022 | Nguyen ............... H04L 41/12 |
| 11,444,974 B1 | 9/2022 | Shakhzadyan |
| 11,483,317 B1 | 10/2022 | Bolignano et al. |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,516,222 B1 | 11/2022 | Srinivasan et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,575,696 B1 | 2/2023 | Ithal et al. |
| 11,606,378 B1 | 3/2023 | Delpont et al. |
| 11,614,956 B2 | 3/2023 | Tsirkin et al. |
| 11,645,390 B2 | 5/2023 | Vijayvargiya et al. |
| 11,662,928 B1 | 5/2023 | Kumar et al. |
| 11,663,340 B2 | 5/2023 | Wu et al. |
| 11,669,386 B1 | 6/2023 | Abrol |
| 11,700,233 B2 | 7/2023 | St. Pierre |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,831,670 B1 | 11/2023 | Molls et al. |
| 11,841,945 B1 | 12/2023 | Fogel |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 12,019,770 B2 | 6/2024 | Nilsson et al. |
| 12,050,696 B2 | 7/2024 | Pieno et al. |
| 12,058,177 B2 | 8/2024 | Crabtree et al. |
| 2003/0188194 A1 | 10/2003 | Currie et al. |
| 2003/0217039 A1 | 11/2003 | Kurtz et al. |
| 2005/0050365 A1 | 3/2005 | Seki et al. |
| 2005/0251863 A1 | 11/2005 | Sima |
| 2005/0283645 A1 | 12/2005 | Turner et al. |
| 2007/0271360 A1 | 11/2007 | Sahita et al. |
| 2008/0075283 A1 | 3/2008 | Takahashi |
| 2008/0221833 A1 | 9/2008 | Brown et al. |
| 2008/0307020 A1 | 12/2008 | Ko et al. |
| 2009/0106256 A1 | 4/2009 | Safari et al. |
| 2009/0271863 A1 | 10/2009 | Govindavajhala et al. |
| 2010/0242082 A1 | 9/2010 | Keene et al. |
| 2010/0281275 A1 | 11/2010 | Lee et al. |
| 2011/0055361 A1 | 3/2011 | Dehaan |
| 2011/0276806 A1 | 11/2011 | Casper et al. |
| 2012/0110651 A1 * | 5/2012 | Van Biljon ............ H04L 63/101 709/201 |
| 2012/0297206 A1 | 11/2012 | Nord et al. |
| 2013/0054890 A1 | 2/2013 | Desai et al. |
| 2013/0124669 A1 | 5/2013 | Anderson et al. |
| 2013/0160119 A1 | 6/2013 | Sartin |
| 2013/0160129 A1 | 6/2013 | Sartin |
| 2014/0096134 A1 | 4/2014 | Barak |
| 2014/0115578 A1 | 4/2014 | Cooper et al. |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0095995 A1 | 4/2015 | Bhalerao |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0310215 A1 | 10/2015 | McBride et al. |
| 2015/0319160 A1 | 11/2015 | Ferguson et al. |
| 2016/0078231 A1 | 3/2016 | Bach et al. |
| 2016/0103669 A1 | 4/2016 | Gamage et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0299708 A1 | 10/2016 | Yang et al. |
| 2016/0366185 A1 | 12/2016 | Lee et al. |

(56) References Cited

U.S. PATENT DOCUMENTS

| | | |
|---|---|---|
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0300690 A1 | 10/2017 | Ladnai et al. |
| 2017/0034198 A1 | 12/2017 | Powers et al. |
| 2017/0374136 A1 | 12/2017 | Ringdahl |
| 2018/0004950 A1 | 1/2018 | Gupta |
| 2018/0026995 A1 | 1/2018 | Dufour et al. |
| 2018/0027009 A1 | 1/2018 | Santos |
| 2018/0063290 A1 | 3/2018 | Yang |
| 2018/0150412 A1 | 5/2018 | Manasse |
| 2018/0159882 A1 | 6/2018 | Brill |
| 2018/0181310 A1 | 6/2018 | Feinberg |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0359058 A1 | 12/2018 | Kurian |
| 2018/0359059 A1 | 12/2018 | Kurian |
| 2018/0367548 A1 | 12/2018 | Stokes, III et al. |
| 2019/0007271 A1 | 1/2019 | Rickards et al. |
| 2019/0043201 A1 | 2/2019 | Strong et al. |
| 2019/0058722 A1 | 2/2019 | Levin et al. |
| 2019/0068617 A1 | 2/2019 | Coleman |
| 2019/0068627 A1* | 2/2019 | Thampy ............... H04L 63/1425 |
| 2019/0081963 A1 | 3/2019 | Waghorn |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Document |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1* | 1/2020 | Vouk ..................... H04L 9/0643 |
| 2020/0007569 A1 | 1/2020 | Dodge et al. |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1 | 7/2020 | Shua |
| 2020/0244692 A1 | 7/2020 | Shua |
| 2020/0259852 A1 | 8/2020 | Wolff et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0014265 A1 | 1/2021 | Hadar et al. |
| 2021/0026932 A1 | 1/2021 | Boudreau et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1* | 6/2021 | Ross ..................... G06F 16/9024 |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1* | 7/2021 | Maor ..................... G06F 16/2379 |
| 2021/0211453 A1 | 7/2021 | Cooney |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0234889 A1 | 7/2021 | Burle et al. |
| 2021/0263802 A1 | 8/2021 | Gottemukkula et al. |
| 2021/0297447 A1 | 9/2021 | Crabtree et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1 | 10/2021 | Shua et al. |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0406365 A1 | 12/2021 | Neil et al. |
| 2021/0409486 A1 | 12/2021 | Martinez |
| 2022/0012771 A1 | 1/2022 | Gustafson |
| 2022/0030020 A1 | 1/2022 | Huffman |
| 2022/0053011 A1 | 2/2022 | Rao et al. |
| 2022/0060497 A1 | 2/2022 | Crabtree et al. |
| 2022/0086173 A1 | 3/2022 | Document |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1* | 9/2022 | Bellinger ............. G06Q 10/063 |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0374519 A1 | 11/2022 | Botelho et al. |
| 2022/0400128 A1* | 12/2022 | Kfir ....................... G06N 3/126 |
| 2022/0407841 A1 | 12/2022 | Karpowicz |
| 2022/0407889 A1* | 12/2022 | Narigapalli ........... H04L 63/101 |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0011957 A1 | 1/2023 | Panse et al. |
| 2023/0040635 A1 | 2/2023 | Narayan |
| 2023/0075355 A1 | 3/2023 | Twigg |
| 2023/0087093 A1 | 3/2023 | Ithal et al. |
| 2023/0095756 A1 | 3/2023 | Wilkinson et al. |
| 2023/0110080 A1 | 4/2023 | Hen |
| 2023/0123477 A1 | 4/2023 | Luttwak et al. |
| 2023/0125134 A1 | 4/2023 | Raleigh et al. |

(56) References Cited

U.S. PATENT DOCUMENTS

| | | |
|---|---|---|
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0161614 A1 | 5/2023 | Herzberg et al. |
| 2023/0164148 A1 | 5/2023 | Narayan |
| 2023/0164164 A1 | 5/2023 | Herzberg et al. |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208870 A1 | 6/2023 | Yellapragada et al. |
| 2023/0224319 A1 | 7/2023 | Isoyama et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabón et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |
| 2024/0241752 A1 | 7/2024 | Crabtree et al. |

FOREIGN PATENT DOCUMENTS

| | | |
|---|---|---|
| RU | 2421792 C2 | 6/2011 |
| SG | 10202009702X | 4/2021 |

OTHER PUBLICATIONS

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Microsoft Build. "Introduction to Azure managed disks". Aug. 21, 2023, https://docs.microsoft.com/en-US/azure/virtual-machines/managed-disks-overview.

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://ieeexplore.IEEE.org/stamp/stamp.jsp?tp=&arnumber=9356962 (Year: 2020).

Written Opinion of the International Searching Authority for PCT Application No. PCT/IB2022/060940 dated Feb. 1, 2023. The International Bureau of WIPO.

Written Opinion of the International Searching Authority, PCT/IB23/55312. ISA/US Commissioner for Patents, Alexandria, Virginia. Dated Aug. 30, 2023.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/stamp.jsp?tp=&arnumber=9014355 (Year: 2019).

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Leibenger, Dominik et al. EncFS goes multi-user: Adding access control to an encrypted file system. 2016 IEEE Conference on Communications and Network Security (CNS). https://ieeexoplore.IEEE.org/stamp/stamp.jsp?tp=&arnumber=7860544 (Year: 2016).

Safaryan, Olga A. et al. Cryptographic Algorithm Implementation for Data Encryption in DBMS MS SQL Server. 2020 IEEE East-West Design & Test Symposium (EWDTS). https://ieeexplore.IEEE.org/stamp/stamp.jsp?tp=&arnumber=9224775 (Year: 2020).

Sahil Suneja; Safe Inspection of Live Virtual Machines; IEEE; Year:2017; pp. 97-111.

Siqi Ma; Certified Copy? Understanding Security Risks of Wi-Fi Hotspot based Android Data Clone Services; ACM; Year: 2021; pp. 320-331.

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.IEEE.org/stamp/stamp.jsp?tp=&arnumber=9250645 (Year: 2020).

\* cited by examiner

CYBERSECURITY THREAT DETECTION UTILIZING UNIFIED IDENTITY MAPPING AND PERMISSION DETECTION

CROSS-REFERENCE TO RELATED APPLICATIONS

This application claims the benefit of U.S. Provisional Application No. 63/222,714 filed on Jul. 16, 2021, the contents of which are hereby incorporated by reference.

TECHNICAL FIELD

The present disclosure relates generally to cybersecurity threat detection, and specifically to determining effective permissions of principals to determine cybersecurity threats.

BACKGROUND

Organizations are increasingly turning to hybrid and multi-cloud platform solutions. Such solutions utilize multiple public cloud computing environments, or combinations of private and public cloud computing environments. Cloud computing environments, such as Amazon® Web Services (AWS), Microsoft® Azure, Google® Cloud platform, and the like, may offer similar functionalities, but often have different implementations, even for similar technology stacks. For example, a container engine deployed in AWS is deployed differently than in Azure. However, each of these platforms may provide different benefits to an organization, which makes it worthwhile to maintain such structures.

A drawback of having a multi-cloud solution is that managing different cloud entities across multiple platforms has increased complexity, especially where the platforms do not offer a bridging solution. Managing access within a cloud computing environment, and between cloud computing environments is crucial for cybersecurity purposes, as mismanaged access can result in mistakes (e.g., a junior grade user shutting down a server) or active cybersecurity threats, such as data theft.

Cloud computing environments include cloud entities such as principals and resources. A principal is a cloud entity that may initiate actions in the cloud computing environment and act on resources. A principal may be a user account, for example. A resource is a cloud entity which provides access to computing resources such as storage, memory, processors, and the like, or services, such as web applications. In order to understand which of these cloud entities may access others, an administrator must check, for each cloud entity, whether it can access, or be accessed by, every other cloud entity.

For typical cloud computing environments, this can lead to a large and complicated calculation requiring large compute and memory resources to accomplish, and in most cases, it is not a feasible solution.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting effective permissions of a principal in a cloud computing environment. The method comprises: detecting a group of principal nodes, each principal node representing a principal in a cloud computing environment, in a security graph, the security graph storing therein a representation of the cloud computing environment; selecting a first principal node from the group of principal nodes; determining a permission between the first principal node and a resource node, wherein the resource node represents a resource deployed in the cloud computing environment; and associating the group of principal nodes with the determined permission.

Certain embodiments disclosed herein also include a non-transitory computer readable medium having stored thereon causing a processing circuitry to execute a process, the process comprising: detecting a group of principal nodes, each principal node representing a principal in a cloud computing environment, in a security graph, the security graph storing therein a representation of the cloud computing environment; selecting a first principal node from the group of principal nodes; determining a permission between the first principal node and a resource node, wherein the resource node represents a resource deployed in the cloud computing environment; and associating the group of principal nodes with the determined permission.

Certain embodiments disclosed herein also include a system for detecting effective permissions of a principal in a cloud computing environment. The system comprises: a processing circuitry; and a memory, the memory containing instructions that, when executed by the processing circuitry, configure the system to: detect a group of principal nodes, each principal node representing a principal in a cloud computing environment, in a security graph, the security graph storing therein a representation of the cloud computing environment; select a first principal node from the group of principal nodes;
  determine a permission between the first principal node and a resource node, wherein the resource node represents a resource deployed in the cloud computing environment; and associate the group of principal nodes with the determined permission.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting permission misconfigurations by detecting effective permissions. Effective permissions are permissions which, for example, a principal has in practice. Effective permissions may or may not overlap with what permissions an administrator intends a principal to have. For example, a principal may have more permissions (i.e., higher permissions), than what an administrator intended to have. The system performs identity mapping for detecting the effective permissions, whereby principals and resources of a cloud computing environment, or of different cloud computing environments, are mapped into a security graph using a unified model. The unified model includes a principal data structure for defining a principal, and a resource data structure which defines a resource. Thus, principals from different cloud environments, for example, are defined using a principal data structure, which allows standardizing how a principal is defined. Principals and resources are cloud entities. A principal is a cloud entity which has permission to act on a resource, for example by initiating actions in or on the cloud computing environment. A principal may be, for example, a user account, a service account, a role, and the like. A resource is a cloud entity which provides access to hardware, such as processing, storage, memory, and the like, or provides access to a service, a virtualization, and the like. A resource may be, for example, a virtual machine, a container, a serverless function, a web application firewall, an application programming interface (API) gateway, a load balancer, a bucket, and the like.

Mapping principals to the security graph further includes detecting permissions accessed from the cloud environment. For example, an API of a cloud computing environment may be queried to determine security policies, permissions, rules, and the like which apply to principals, resources, and a combination thereof. Principals and resources are represented (i.e., mapped) in the security graph by nodes, each node generated based on the corresponding data structure. A permission may be represented in the security graph by an edge, such that an edge connecting a principal node (i.e., a node representing a principal) to a resource node (i.e., a node representing a resource) indicates a certain permission, whereby the principal has a permission with respect to the resource.

Traversing the security graph allows detection of cybersecurity threats, for example by detecting permission escalation potential between two or more principal nodes, detecting effective permissions of a principal, and the like. However, determining permissions for each principal on each resource is a processing intensive procedure. Therefore, in order to decrease complexity of the security graph, various optimizations, such as utilizing maximal biclique, are implemented when generating connections (i.e., representing permissions) in the graph between principals and resources. This allows to decrease memory usage and processing resources, resulting in a system with increased security utilizing less resources than the prior art.

It is noted in this regard that determining effective permissions is something a human can do. However, it is recognized that cloud computing environments contain many relationships between principals and resources, often exceeding thousands in number. Even where a human could conceivably determine what the effective permissions are for each principal acting on each resource, no human can compute this fast enough to be actionable in the context of a cybersecurity threat. Furthermore, these relationships constantly change as administrators are changing the environments, resources, such as containers, are spun up and spun down, all of which result in effective permissions being constantly subject to change.

Additionally, certain advantages disclosed herein, such as utilizing maximal bicliques, improve the operation of a computer system determining effective permissions, and as such cannot be performed by a human.

Figure 1:
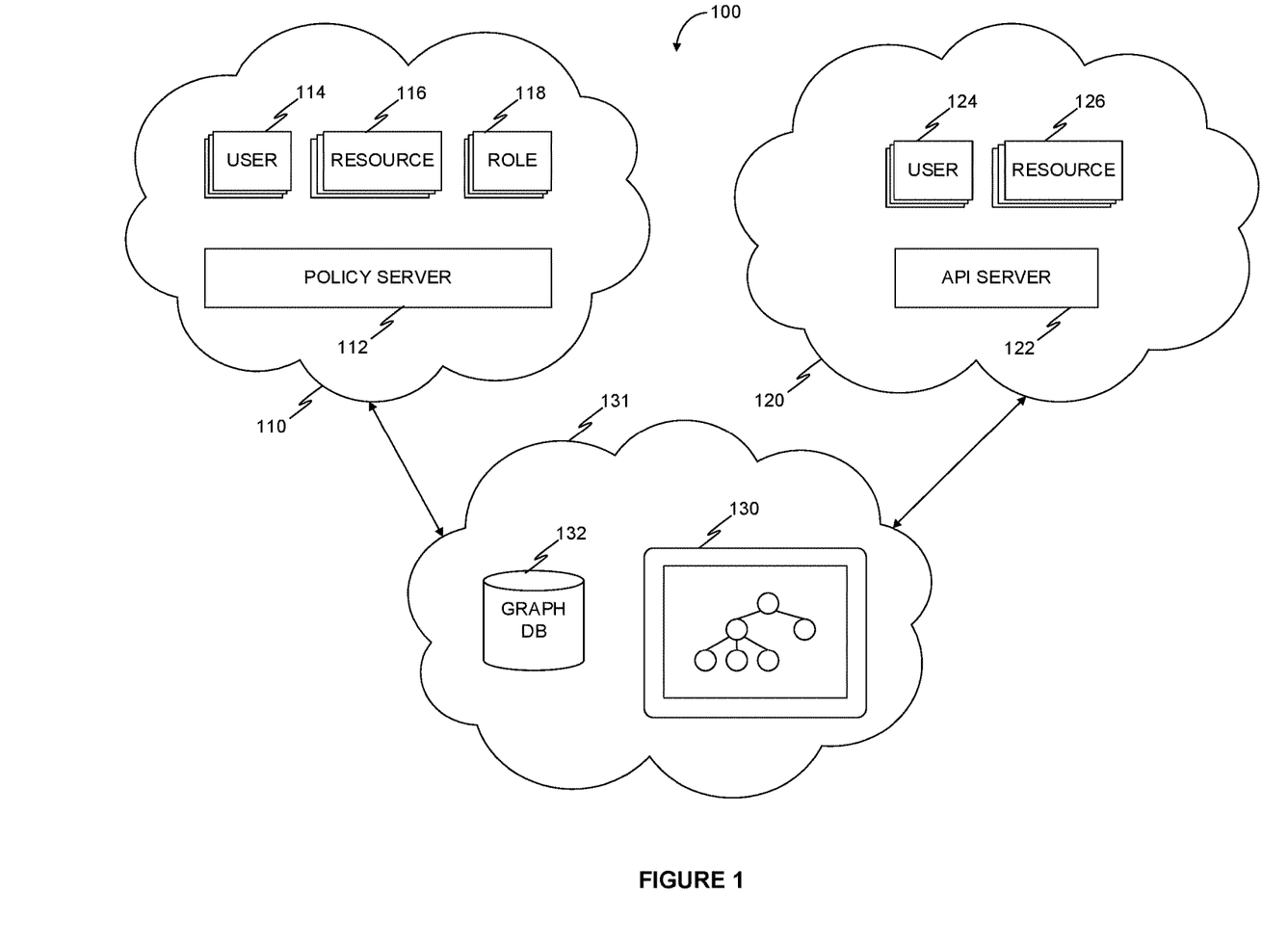
FIG. 1 is a schematic illustration of multiple cloud-based computing environments communicatively connected to a unifying identity mapper, implemented in accordance with an embodiment.

FIG. 1 is an example of a schematic illustration 100 of multiple cloud computing environments communicatively connected to a unifying identity mapper, implemented in accordance with an embodiment. A cloud computing environment may be, for example, Amazon® Web Services (AWS), Microsoft® Azure, Google® Cloud Platform (GCP), and the like. Cloud computing environments may each operate with one or more standards (i.e., models), and achieve similar or different functionality in different or similar manners. An organization of users may use a first type of cloud environment for a first purpose, where it is advantageous, and a second type of cloud environment for a second purpose, where the second environment is likewise advantageous. For example, an organization may simultaneously utilize AWS for providing a first type of service, and GCP for providing a second type of service However, utilizing different cloud environments may lead to complicated security policies, which in turn can present vulnerabilities for an organization. In order to at least minimize these, it would be beneficial to have a single normalized (i.e., unified) model for all cloud computing environments, in order to more easily understand where potential threats and risks are.

Generally, every cloud environment includes principals, which act on resources. A principal may be a user account, service account, role, and the like, while a resource may be a virtual machine, container, serverless function, and the like. Each cloud computing environment may include different definitions and data structures for what constitutes a principal or a resource. For example, in some cloud environments code may execute as a user account rather than a service account, while in others code can only execute as a service account.

A first cloud computing environment 110 includes a plurality of user accounts 114, a plurality of resources 116, and a plurality of roles 118. A role 118 is a set of one or more permissions which may be associated with one or more user accounts 114. A user account 114 may be associated with a plurality of roles. The cloud computing environment 110 further includes a policy server 112, which includes one or more policies, each policy including one or more permissions which allow a user account 114, a role 118 or both, access to a resource 116. A policy may be implemented, for example, as a JSON file including therein text which indicates what certain permissions are. A policy may include wildcards, allowing, for example, every user account having an email address at a first domain access to a first resource, and user accounts having an email address at a second domain access to the first resource and to a second resource.

A second cloud computing environment 120 includes a plurality of user accounts 124, a plurality of resources 126, and an API server 122. The API server 122 may provide upon request data including user accounts, applications, resources, and relationships (i.e., permissions) between them.

Each of the cloud computing environments 110 and 120 are communicatively connected to a unifying identity mapper 130. In an embodiment, the unifying identity mapper 130 may be implemented in a security environment 131. The security environment 131 may be implemented as a cloud computing environment, such as Azure. The security environment 131 further includes a graph database 132, on which a security graph may be stored. A security graph is configured to represent a plurality of cloud computing environments. For example, the unifying identity mapper 130 may store identities as nodes in the security graph, where a node represents an identity. An identity may be, for example, a unique user account, unique service account, and the like.

In an embodiment, the first cloud computing environment 110 and the second cloud computing environment 120 may be the same type of cloud environment, or different types of cloud environments. For example, a first cloud computing environment may be deployed in AWS, while the second cloud computing environment is deployed in Azure. As another example, the first and second cloud computing environments 110 and 120 may be both deployed in AWS, as separate environments under the same cloud computing architecture. For example, each cloud computing environment may be deployed as a virtual private cloud (VPC) in AWS.

In some embodiments, the unifying identity mapper 130 (also referred to as mapper 130) may be implemented in the first cloud computing environment 110, the second cloud computing environment 120, or a different networked or cloud computing environment. The mapper 130 is configured to receive from each cloud computing environment data pertaining to principals, user accounts, service accounts, resources, roles, policies, permissions, and the like.

Receiving such data may be different based on the cloud environment architecture. For example, Google® Cloud Platform provides such information by accessing an API. In an embodiment the mapper 130 is configured to call the API with a request to receive the data. As another example, AWS utilizes policies which may be requested as JSON files. In an embodiment the mapper 130 is configured to read data from the JSON file. The mapper 130 is further configured to map the received data into a security graph. Mapping the received data may include generating nodes in the security graph representing principals, and resources, and connecting the nodes (i.e., generating edges) based on permissions which are read from the received data. This is discussed in more detail in FIG. 3 herein. In an embodiment, the mapper 130 may be deployed on a physical or virtual machine. When deployed on a virtual machine (or other virtualization) a computing architecture may serve as underlying hardware. An embodiment of a mapper 130 is discussed in more detail in FIG. 7 below.

Figure 2A:
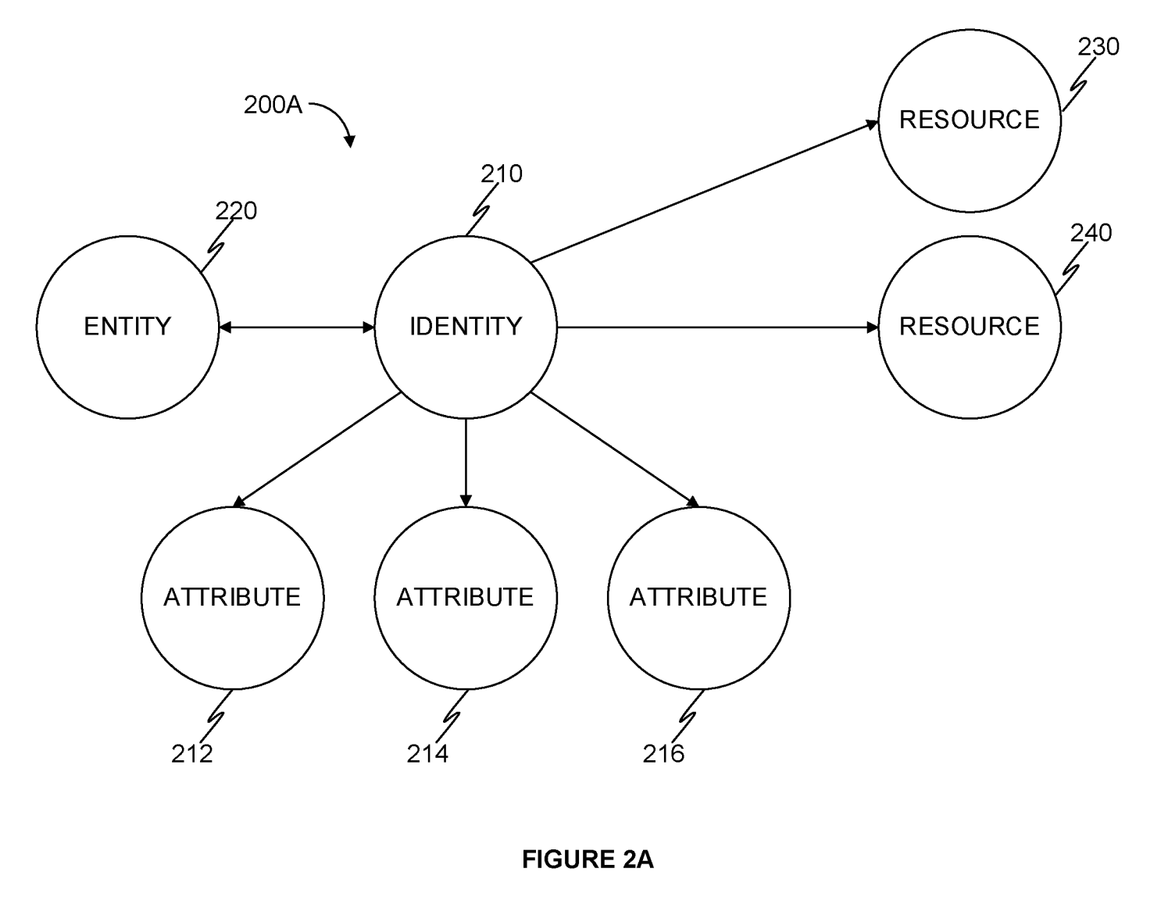
FIG. 2A is a portion of a unified graph model generated by a unifying identity mapper, and implemented in accordance with an embodiment.

FIG. 2A is an example of a portion of a security graph 200A generated by a unifying identity mapper, implemented in accordance with an embodiment. An identity is a unique identifier of, for example, a principal. The principal acts on resources, such as a first resource, represented by first resource node 230 and a second resource, represented by second resource node 240. An identity node 210 represents an identity, such as a username, and may be associated with an entity node 220. The entity node 220 may be a person, organization, and so on. For example, the entity may be an individual named "John Smith", and the identity may be a username "john.smith@example.com".

Each identity 210 may be connected to a plurality of attributes, such as a first attribute 212, a second attribute 214, and third attribute 216. While three attributes are used in this example, it is readily understood that any number of attributes may define an identity node, and that each identity node may be defined by one or more attributes. An attribute may be metadata. For example, a role identifier (e.g., "admin") may be an attribute of an identity node (e.g., indicating an identity is an administrator).

Figure 2B:
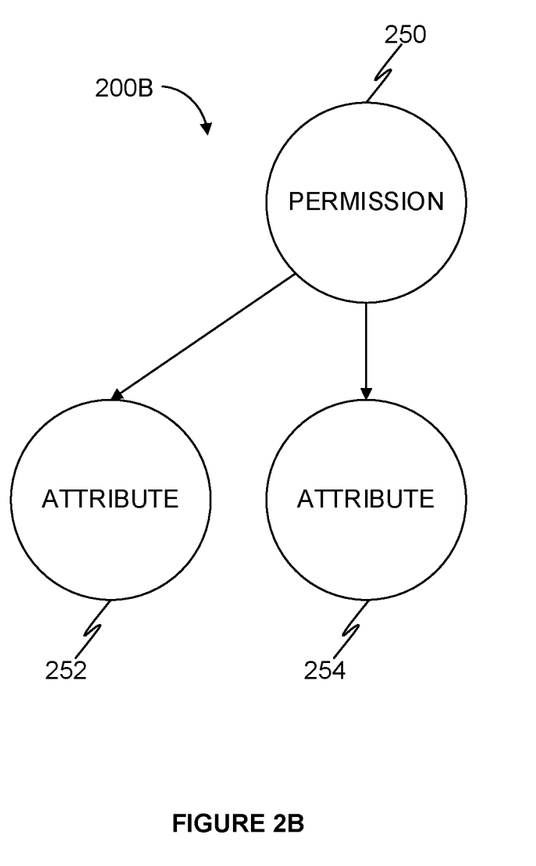
FIG. 2B is another portion of a unified graph model generated by a unifying identity mapper, and implemented in accordance with an embodiment.

FIG. 2B is an example of another portion of a security graph 200B generated by a unifying identity mapper, implemented in accordance with an embodiment. A permission node 250, representing a permission, is connected with a first attribute node 252, and a second attribute node 254. While two attributes are used in this example, it is readily understood that any number of attributes may define a permission node 250, and that each permission node may be defined by one or more attributes. An attribute of a permission node 250 may indicate different permission types, such as reading, writing, or erasing files, agents, administrator or root roles, and the like. A permission node 250 may be connected to an identity node, such as the identity node 210 of FIG. 2A. In other embodiments, a permission may be stored in the security graph as an edge. For example, a principal node connected with an edge to a resource node, wherein the edge indicates the permission the principal node carries with respect to the resource node.

Figure 3:
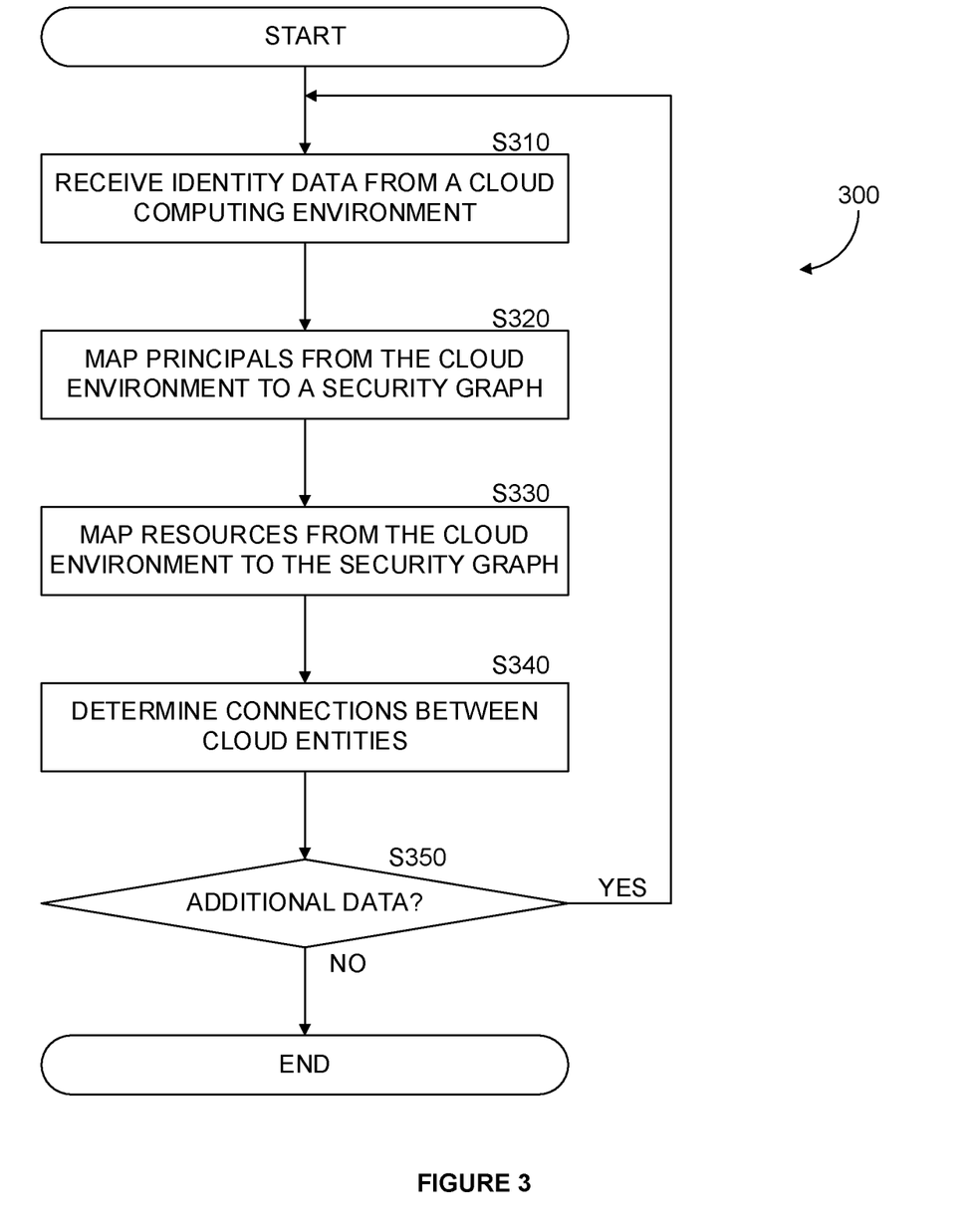
FIG. 3 is a flowchart of a method for mapping principals and resources from a first computing environment utilizing a unified identity mapper, implemented in accordance with an embodiment.

FIG. 3 is an example flowchart 300 of a method for mapping principals and resources from a cloud computing environment into a security graph utilizing a unified identity mapper, implemented in accordance with an embodiment.

At S310, identity data is received from a cloud computing environment. Identity data may include information relating to principals, resources, and connections between principals and resources. For example, information may be identifiers, such as username, account name, role identifier, service account identifier, network address, IP address, and the like. Connections between principals and resources may be defined by policies, permissions, and the like. For example, a policy may indicate that a user account associated with a certain predefined role may access a first plurality of resources in a cloud computing environment.

At S320, a plurality of principals from the cloud computing environment are each mapped to a corresponding principal node of a security graph. In an embodiment mapping includes generating the principal node and associating it with the principal. Associating a principal with a principal node may include, for example, storing a unique identifier of the principal on the principal node. A principal node may be, for example, an identity node. For example, a user account is a principal, and the user account is mapped to a principal node representing the user account. The security graph may further store metadata associated with the user account, such as a username.

At S330 a plurality of resources from the cloud computing environment are each mapped to a corresponding resource node of the security graph. In an embodiment, mapping is performed by generating a resource node and associating it with the resource. Associating may be performed by storing a unique identifier of the resource on the resource node. A resource node may be, for example, a node representing a virtual machine, a container, a serverless function, a software application, an operating system, a WAF, a gateway, a load balancer, and the like.

In an embodiment, a generated resource node, and a generated principal node, may each store information, for example as data attributes, which points to a corresponding identity, resource, and the like, to which they are mapped, enabling a trace between the representation (e.g., principal node) and the represented object (specific username). In some embodiments, an object (i.e., cloud entity) in a cloud computing environment may be a principal, and also a resource to other principals. For example, a load balancer may be a resource for a user account, but a principal for a web server which utilizes the load balancer. The security graph may further store metadata for a resource node, such as IP address, name in a namespace, etc.

At S340 a connection is determined between a first cloud entity and a second cloud entity in the cloud computing environment. The first cloud entity and the second cloud entity each may be a principal, or a resource. In an embodiment, determining a connection includes reading a policy, a permission, and the like, and determining a relationship between a first cloud entity and a second cloud entity, wherein the cloud entities form a condition of the policy, permission, and the like. In an embodiment, a cloud entity may be a role, and associated with a role node, implemented as a type of principal node. A role node is associated with a specific role (i.e., set of one or more permissions relating to a resource). Determining a connection may include reading data from a policy in order to determine if a permission exists to allow communication between the principal node and another principal node or a resource node. In an embodiment, a determined connection is stored as an edge in the security graph. For example, a connection indicating that a principal can access a resource may be stored as a principal node connected by an edge to a resource node, wherein the edge indicates a "can access" type connection.

At S350 a check is performed if additional data is received. If yes, execution continues at S310. Otherwise, execution may terminate. In some embodiments, a check may be performed to determine if additional principals need to be mapped. If yes, execution continues at S320. In yet other embodiments, a check may be performed to determine if additional resources need to be mapped. If yes, execution may continue at S330.

Figure 4:
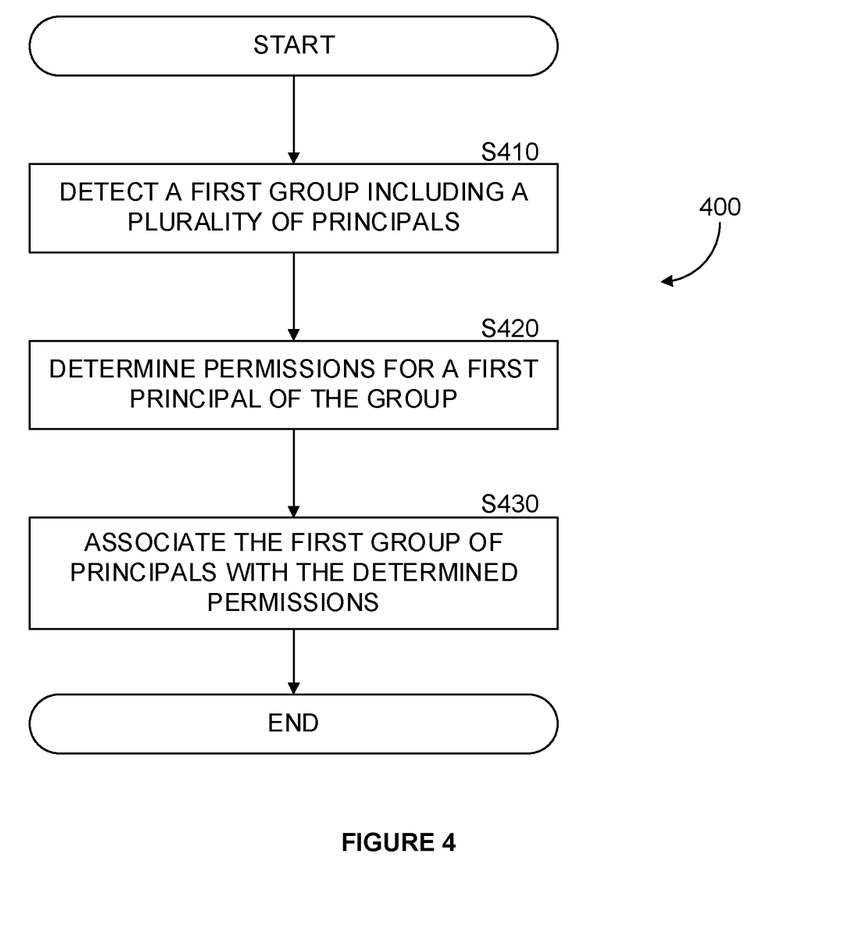
FIG. 4 is a flowchart of a method for determining effective permissions of a principal in a cloud based computing environment, implemented in accordance with an embodiment.

FIG. 4 is an example flowchart 400 of a method for determining effective permissions of a principal in a cloud computing environment, implemented in accordance with an embodiment. Determining effective permissions is advantageous from a cybersecurity perspective as it allows to realistically understand where potential security threats may arise. For example, assuming a certain user has limited permissions, only to discover that the user has permissions which exceed those limitations, is a typical scenario in cybersecurity incidents.

In order to determine effective permissions, permissions need to be determined for each principal on each resource, e.g., determining if each principal can access each resource. Performing such a calculation is processing intensive, as well as requiring large amounts of memory due to the volume of both principals and resources in a cloud computing environment. This complication is compounded when also taking into account that certain service accounts may assume other service accounts (for example across different cloud platforms), certain user accounts may assume other user accounts, and certain resources may also be principals. The disclosed embodiments reduce the burden of processing and memory usage, for example by reducing the amount of checks performed for each principal-resource combination, while still maintaining complete information on effective permissions.

At S410, a group of a plurality of principals is detected in a security graph. The security graph, as detailed above, represents a cloud computing environment of which principals and resources are represented as nodes in the security graph. Detecting a group of principals may be performed, for example, by utilizing vertex maximal bicliques. A biclique is maximal when it is the largest size, based on number of nodes (vertex maximum biclique) or number of edges (edge maximum biclique). A biclique is a bipartite graph where every node of the first set (principals) is connected to every node of the second set (resources). Each principal in the group has the same permissions to act on each of the resources. By only determining in the next steps permissions for one principal as a representative of the group, redundant determinations are not performed, thereby decreasing processing and memory requirements.

At S420, permissions are determined for a first principal of the group with respect to a resource. In an embodiment, permissions may be associated with a resource, a plurality of resources, and the like. A permission may be an access policy, an access rule, and the like. Permissions may include a permission set, which is a group of permissions which together define access to a particular resource, group of resources, action, actions, and the like. For example, a first permission set (i.e., role) may be associated with a first resource, a second permission set may be associated with a second resource, and so on.

At S430 the first group of principals is associated with the determined permissions. In an embodiment, associating a group of principals with the determined permissions includes generating a node representing the effective permissions in the security graph. An edge is generated between each of the principal nodes representing the first group of principals, to the node representing the effective permissions. By associating all the principals based on determining permissions for a single principal, many redundant calculations are not performed, thereby reducing compute and memory resources required for computing and storing the redundant information. In other embodiments, a principal group node may be generated, to represent the first group of principals. The principal group node may be associated with the permission, for example by connecting the principal group node to the resource node with an edge representing the permission. Each of the principal nodes may be in turn connected to the principal group node.

Figure 5:
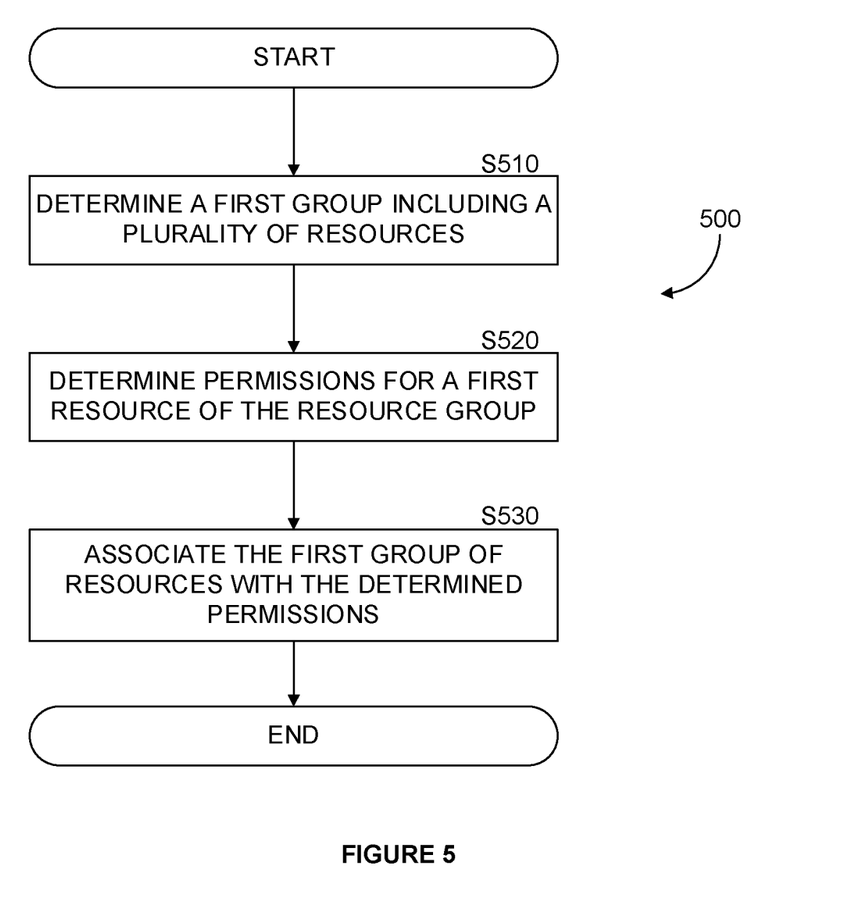
FIG. 5 is a flowchart of a method for determining effective permissions of a resource in a cloud-based computing environment, implemented in accordance with an embodiment.

FIG. 5 is an example flowchart 500 of a method for determining effective permissions of a resource in a cloud environment, implemented in accordance with an embodiment. Determining effective permissions is advantageous from a security perspective as it allows to realistically understand where potential security threats may arise. For example, assuming a certain resource may be supposed to have limited permissions, however, the resource can assume a role which would allow the resource additional permissions which were not intended.

In order to determine effective permissions, permissions need to be determined for each resource on each other resource, e.g., determining if each resource can access each other resource. Performing such a calculation is processing intensive, as well as requiring large amounts of memory due to the volume of both principals and resources in a cloud computing environment. This complication is compounded when also taking into account that certain service accounts may assume other service accounts (for example across different cloud platforms), certain user accounts may assume other user accounts, and certain resources may also be principals. The disclosed embodiments reduce the burden of processing and memory usage, for example by reducing the amount of checks performed for each principal-resource combination, while still maintaining complete information on effective permissions.

At 510 a first group of a plurality of resources is detected in a security graph. The security graph, as detailed above, represents a cloud computing environment of which principals and resources are represented as nodes in the security graph. Detecting a group of resources may be performed, for example, by utilizing vertex maximal bicliques. A biclique is maximal when it is the largest size, based on number of nodes (vertex maximum biclique) or number of edges (edge maximum biclique). A biclique is a bipartite graph where every node of the first set (resources) is connected to every node of the second set (other resources). Each resource in the group has the same permissions to act on each of the other resources. By only determining in the next steps permissions for one resource as a representative of the group, redundant determinations are not performed, thereby decreasing processing and memory requirements.

At S520 permissions are determined for a first resource of the first group. The permissions may be associated with one or more resources or principals. For example, a first permission set (i.e., role) may be associated with a first resource, a second permission set may be associated with a second resource, etc. A permission may be, for example, permission to read data from a storage, and permission to write data to the storage.

For example, a first group may have permission to read from the storage, while a second group may have permissions to read and write to the storage. As another example, a serverless function may have permission to write to a storage of a distributed storage system, which includes multiple storage devices. As the multiple storage devices share a common policy, the serverless function has permission to write to any of the multiple storage devices. By grouping the storage devices (i.e., utilizing maximal bicliques), less memory is required to indicate that the serverless function has permission to write to any of the multiple storage devices.

At 530 the first group of resources is associated with the determined permissions. In an embodiment, associating a group of resources with the determined permissions includes generating a node representing the effective permissions in the security graph. An edge is generated between each of the resource nodes representing the first group of resources, to the node representing the effective permissions. By associating all the resources based on determining permissions for a single resource, many redundant calculations are not performed, thereby reducing compute and memory resources required for storing the redundant information.

Figure 6:
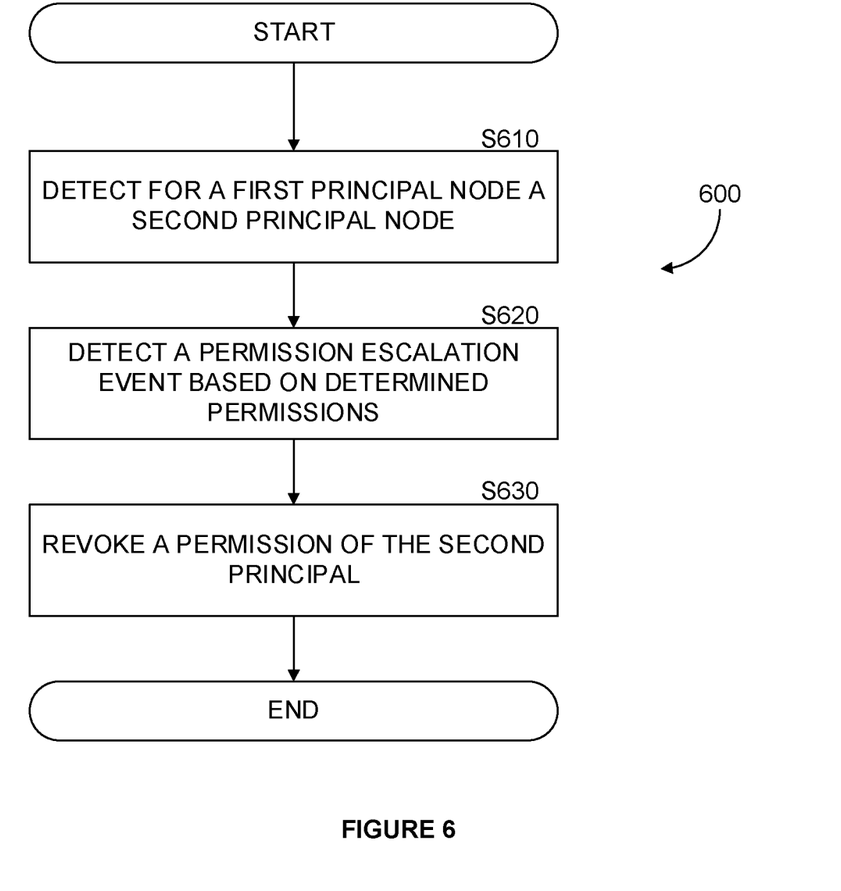
FIG. 6 is a flowchart of a method for detecting permission escalation utilizing a unified identity model, implemented in accordance with an embodiment.

FIG. 6 is an example flowchart 600 of a method for detecting permission escalation utilizing a unified identity model on a security graph, implemented in accordance with an embodiment. Permission escalation is a type of cybersecurity risk where a principal (e.g., a user account) has access to resources which they are not intended to have, by gaining a permission they did not previously possess and are not supposed to possess. A vertical escalation occurs when a principal is able to access resources which are only accessible to principals having higher access. A horizontal escalation occurs when a principal has access to resources of another similar principal (e.g., user Alice is able to access emails of user Bob).

At S610 a second principal node is detected for a first principal node in a security graph. The second principal (represented by the second principal node) is able to assume the first principal (represented by the first principal node), i.e., the second principal may act as the first principal, in some, or all aspects. Permissions of a principal may change when acting through (i.e., assuming) another principal. For example, an application may have permission to perform a wide variety of operations in a cloud computing environment. However, a user account operating the application may only access limited permissions of all the permissions available to the application.

In an embodiment, detecting the second principal node may be performed by querying the security graph to detect principal nodes which are connected to the first principal node.

At S620, a permission escalation event is detected based on determined permissions of the first principal node and the second principal node. In an embodiment, detecting a permission escalation event may occur when an access occurs which involves a principal which is not authorized for the access. For example, the second principal is not authorized to access a resource which the first principal is authorized to access. When the second principal is allowed to assume the first principal, the second principal has an effective permission to access the first resource, which should not be permitted.

As another example, the second principal may assume a role of the first principal node, and as the first principal node grant additional permissions to the second principal which were not previously available. The additional permissions are stored on the security graph and can be detected, for example by querying the security graph to detect permissions granted by a first principal to a second principal, where the second principal can assume a role of the first principal.

This detection is possible by tracing the connection between the access and the principal utilizing the security graph described above.

At S630, a permission associated with the second principal is revoked. Revoking a permission is performed in an attempt to prevent the escalation event. In another embodiment, a notification may be generated to an administrator account to notify that a potential permission escalation may occur.

Figure 7:
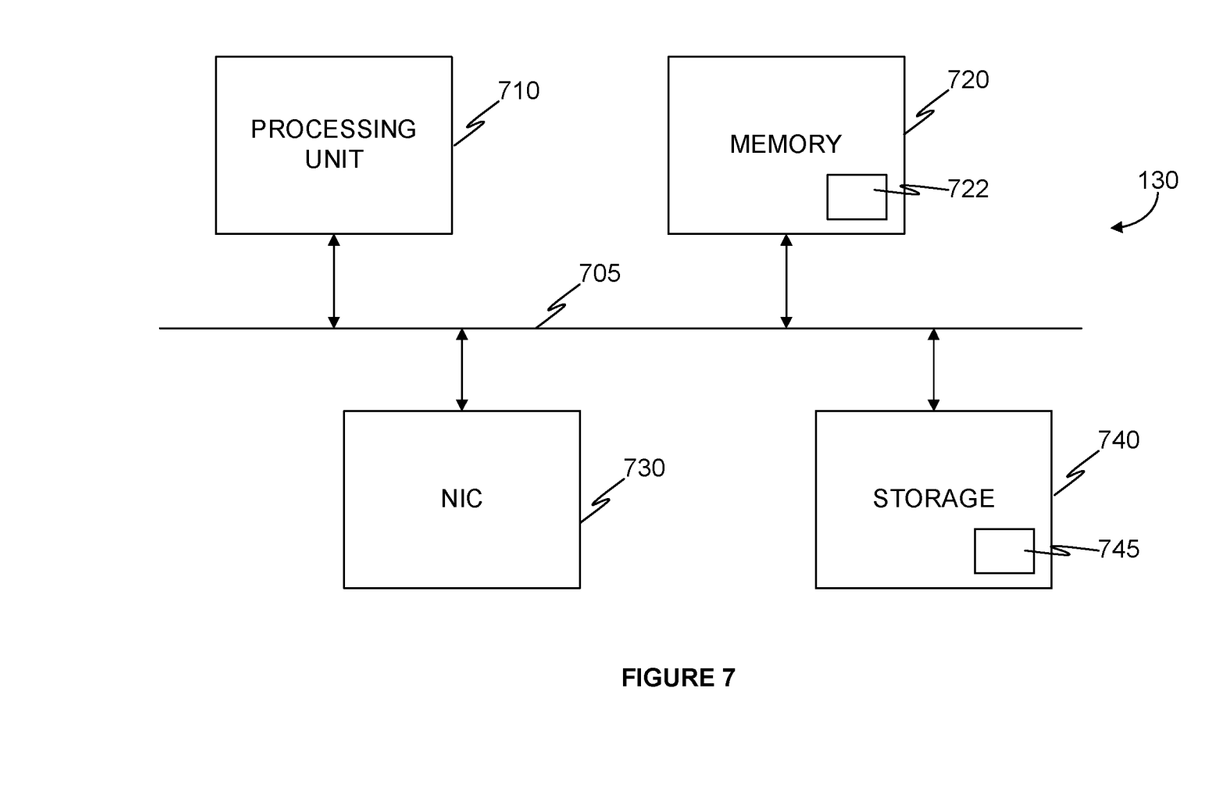
FIG. 7 is a schematic illustration of a mapper, implemented according to an embodiment.

FIG. 7 is an example of a schematic illustration of a mapper 130 implemented according to an embodiment. The mapper may be a physical or virtual machine. The mapper 130 includes at least one processing element 710, for example, a central processing unit (CPU). In an embodiment, the processing element 710 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing element 710 is coupled via a bus 705 to a memory 720. The memory 720 may include a memory portion 722 that contains instructions that when executed by the processing element 710 performs the method described in more detail herein. The memory 720 may be further used as a working scratch pad for the processing element 710, a temporary storage, and others, as the case may be. The memory 720 may be a volatile memory such as, but not limited to random access memory (RAM), or non-volatile memory (NVM), such as, but not limited to, Flash memory.

The processing element 710 may be coupled to a network interface controller (NIC) 730, which provides connectivity to one or more cloud computing environments, via a network.

The processing element 710 may be further coupled with a storage 740. Storage 740 may be used for the purpose of holding a copy of the method executed in accordance with the disclosed technique. The storage 740 may include a storage portion 745 containing a security graph model (i.e., a data structure for a principal, and a data structure for a resource) into which principals and resources of a cloud environment are mapped to corresponding nodes, and connections between the nodes are determined based on data received from the cloud environment indicating permissions of each principal to act on one or more resources.

The processing element 710 and/or the memory 720 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting effective permissions of a principal in a cloud computing environment, comprising:
   detecting a group of principal nodes, each principal node representing a principal in a cloud computing environment, in a security graph, the security graph storing therein a representation of the cloud computing environment;
   selecting a first principal node from the group of principal nodes, wherein the first principal node is representative of all of the principal nodes of the group;
   determining a permission between the first principal node and a resource node, wherein the resource node represents a resource deployed in the cloud computing environment; and
   associating the group of principal nodes with the determined permission thereby representing a grant of the determined permission to each principal node of the group of principal nodes.

2. The method of claim 1, wherein the first principal node represents at least one of: a user account, a service account, and a role.

3. The method of claim 1, wherein the resource node represents at least one of: a virtual machine, a container, a serverless function, and an application.

4. The method of claim 1, further comprising:
generating the group of principal nodes by applying maximal biclique detection on the security graph.

5. The method of claim 1, further comprising:
receiving at least one of: a permission set, an access rule, and an access policy.

6. The method of claim 5, wherein the permission is determined based on the received at least one of: the permission set, the access rule, and the access policy.

7. The method of claim 1, further comprising:
generating an edge between each principal node of the group of principal nodes and the resource node.

8. The method of claim 1, further comprising:
generating principal group node representing the group of principal nodes; and
generating an edge between the resource node and the principal group node, wherein the edge represents the determined permission.

9. The method of claim 8, further comprising:
generating an edge between each principal node of the group of principal nodes and the principal group node.

10. A non-transitory computer readable medium having stored thereon instructions for causing a processing circuitry to execute a process, the process comprising:
detecting a group of principal nodes, each principal node representing a principal in a cloud computing environment, in a security graph, the security graph storing therein a representation of the cloud computing environment;
selecting a first principal node from the group of principal nodes, wherein the first principal node is representative of all of the principal nodes of the group;
determining a permission between the first principal node and a resource node, wherein the resource node represents a resource deployed in the cloud computing environment; and
associating the group of principal nodes with the determined permission associating the group of principal nodes with the determined permission thereby representing a grant of the determined permission to each principal node of the group of principal nodes.

11. A system for detecting effective permissions of a principal in a cloud computing environment, comprising:
a processing circuitry; and
a memory, the memory containing instructions that, when executed by the processing circuitry, configure the system to:
detect a group of principal nodes, each principal node representing a principal in a cloud computing environment, in a security graph, the security graph storing therein a representation of the cloud computing environment;
select a first principal node from the group of principal nodes, wherein the first principal node is representative of all of the principal nodes of the group;
determine a permission between the first principal node and a resource node, wherein the resource node represents a resource deployed in the cloud computing environment; and
associate the group of principal nodes with the determined permission associating the group of principal nodes with the determined permission thereby representing a grant of the determined permission to each principal node of the group of principal nodes.

12. The system of claim 11, wherein the first principal node represents at least one of: a user account, a service account, and a role.

13. The system of claim 11, wherein the resource node represents at least one of: a virtual machine, a container, a serverless function, and an application.

14. The system of claim 11, wherein the memory container further instructions which when executed by the processing circuitry further configure the system to:
generate the group of principal nodes by applying maximal biclique detection on the security graph.

15. The system of claim 11, wherein the memory container further instructions which when executed by the processing circuitry further configure the system to:
receive at least one of: a permission set, an access rule, and an access policy.

16. The system of claim 15, wherein the permission is determined based on the received at least one of: the permission set, the access rule, and the access policy.

17. The system of claim 11, wherein the memory container further instructions which when executed by the processing circuitry further configure the system to:
generate an edge between each principal node of the group of principal nodes and the resource node.

18. The system of claim 11, wherein the memory container further instructions which when executed by the processing circuitry further configure the system to:
generate principal group node representing the group of principal nodes; and
generate an edge between the resource node and the principal group node, wherein the edge represents the determined permission.

19. The system of claim 18, wherein the memory container further instructions which when executed by the processing circuitry further configure the system to:
generate an edge between each principal node of the group of principal nodes and the principal group node.

20. The method of claim 1, wherein the group of principal nodes includes at least a first principal node representing a first principal of a first cloud computing environment and a second principal node representing a principal of a second cloud computing environment.

* * * * *